United States Patent
Sevindik et al.

(10) Patent No.: US 11,277,733 B2
(45) Date of Patent: Mar. 15, 2022

(54) DATA TRANSFER USING A DUAL SIM PHONE

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 16/777,751

(22) Filed: Jan. 30, 2020

(65) Prior Publication Data

US 2021/0243589 A1 Aug. 5, 2021

(51) Int. Cl.
| | |
|---|---|
| H04W 4/20 | (2018.01) |
| H04W 4/02 | (2018.01) |
| H04W 8/18 | (2009.01) |
| H04W 12/06 | (2021.01) |
| H04L 101/654 | (2022.01) |
| H04W 8/20 | (2009.01) |

(52) U.S. Cl.
CPC ......... *H04W 8/183* (2013.01); *H04L 61/6054* (2013.01); *H04W 8/20* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,200,212 B2 | 6/2012 | Rappaport et al. |
| 8,897,702 B2 | 11/2014 | Niu et al. |
| 9,826,570 B1 | 11/2017 | Gupta et al. |
| 9,854,004 B2 | 12/2017 | Bharadwaj |
| 10,492,204 B2 | 11/2019 | Kakinada et al. |
| 10,623,943 B1 | 4/2020 | Sevindik |
| 10,708,857 B2 | 7/2020 | Dhillon et al. |
| 11,019,563 B1 | 5/2021 | Sevindik et al. |

(Continued)

FOREIGN PATENT DOCUMENTS

| | | |
|---|---|---|
| WO | WO2017136959 A1 | 8/2017 |
| WO | 2020070716 A1 | 4/2020 |

OTHER PUBLICATIONS

Authorized Officer Harry C. Kim PCT Application PCT/US2020/055963 International Search Report and Written Opinion of The ISA, 8 Pages Total, dated Dec. 21, 2020.

(Continued)

*Primary Examiner* — Gary Lafontant
(74) *Attorney, Agent, or Firm* — Otterstedt, Wallace & Kammer, LLP

(57) ABSTRACT

A first subscriber identification module (SIM) of a dual SIM device is connected to a network. A small cell is informed that the dual SIM device is a dual SIM-type device and a first radio frequency device of the dual SIM device is attached to the network. A second radio frequency device of the dual SIM device is attached to the network. The small cell is configured to treat a second SIM as a control SIM and to treat the first SIM a data SIM. User data is transferred to the first radio frequency device, a control channel switch command is sent to the dual SIM device, and control information is transferred to the second radio frequency device.

20 Claims, 10 Drawing Sheets

(56) References Cited

U.S. PATENT DOCUMENTS

| | | |
|---|---|---|
| 2004/0090971 A1 | 5/2004 | Anderson, IV |
| 2008/0155589 A1 | 6/2008 | McKinnon et al. |
| 2009/0187480 A1 | 7/2009 | Bernard et al. |
| 2011/0264530 A1 | 10/2011 | Santangelo et al. |
| 2013/0182697 A1 | 7/2013 | Tuominen et al. |
| 2015/0223090 A1 | 8/2015 | Van Lieshout et al. |
| 2015/0295692 A1* | 10/2015 | Gowda ................ H04L 5/0055 370/336 |
| 2015/0373554 A1 | 12/2015 | Freda et al. |
| 2016/0135213 A1 | 5/2016 | Zhu et al. |
| 2017/0127305 A1 | 5/2017 | Dev et al. |
| 2017/0134994 A1 | 5/2017 | Chinthalapudi et al. |
| 2017/0181071 A1 | 6/2017 | Lipka |
| 2018/0026903 A1 | 1/2018 | Kotreka et al. |
| 2018/0027567 A1* | 1/2018 | Saghir .................. H04W 4/08 370/230 |
| 2018/0097585 A1 | 4/2018 | Dev et al. |
| 2018/0270649 A1 | 9/2018 | Tsai et al. |
| 2019/0045397 A1 | 2/2019 | Mueck et al. |
| 2019/0058999 A1 | 2/2019 | Gunasekara et al. |
| 2019/0069004 A1 | 2/2019 | Badawiyeh |
| 2019/0069224 A1 | 2/2019 | Lee et al. |
| 2019/0082446 A1 | 3/2019 | Guo et al. |
| 2019/0090309 A1 | 3/2019 | Wong et al. |
| 2019/0115950 A1 | 4/2019 | Kakinada et al. |
| 2019/0116239 A1 | 4/2019 | Jagannath et al. |
| 2019/0150134 A1 | 5/2019 | Kakinada et al. |
| 2019/0223025 A1 | 7/2019 | Kakinada et al. |
| 2019/0230500 A1 | 7/2019 | Goncalves et al. |
| 2019/0294829 A1 | 9/2019 | Zhou |
| 2019/0364565 A1 | 11/2019 | Hmimy et al. |
| 2019/0372689 A1 | 12/2019 | Carter et al. |
| 2020/0008007 A1 | 1/2020 | Belghoul et al. |
| 2020/0008143 A1 | 1/2020 | Jain et al. |
| 2020/0008196 A1 | 1/2020 | Low et al. |
| 2020/0037211 A1 | 1/2020 | Hine et al. |
| 2020/0068647 A1 | 2/2020 | Jha et al. |
| 2020/0100098 A1 | 3/2020 | Bai et al. |
| 2020/0107293 A1 | 4/2020 | Cui et al. |
| 2020/0112851 A1 | 4/2020 | Wane |
| 2020/0146032 A1 | 5/2020 | Bae et al. |
| 2020/0169858 A1 | 5/2020 | Hu et al. |
| 2020/0329523 A1 | 10/2020 | Yi et al. |
| 2021/0117368 A1 | 4/2021 | Sevindik et al. |

OTHER PUBLICATIONS

Volkan Sevindik et al., unpublished U.S. Appl. No. 16/807,054, filed Mar. 2, 2020, Dual Subscriber Dentification Module (SIM) Customer Premises Equipment (CPE) for Wireless Network Power Measurements pp. 1-31 and 7 sheets drawings.

Fierce Wireless, Charter's MVNO counts 21,000 lines as executives hint at eSIM plans a . . . , Oct. 26, 2018, pp. 1-5, https://www.fiercewireless.com/wireless/charter-s-mvno-counts-21-000-I . . . .

Fierce Wireless, Charter updates MVNO progress, explores dual SIM connectivity, May 1, 2019, pp. 1-4, https://www.fiercewireless.com/wireless/charter-updates-mvno-progress . . . .

The Wireless Innovation Forum, Copyright 2018, Acronyms and Definitions Pertaining to Commercial Operations in the U.S. 3550-3700 MHz Band, pp. 1-10.

Wikipedia, "Phablet," last edited on Nov. 3, 2019, pp. 1-14, https://en.wikipedia.org/wiki/Phablet.

Wikipedia, "Dual SIM," last edited on Nov. 6, 2019, pp. 1-6, https://en.wikipedia.org/wiki/Dual_SIM.

OnQ Blog, Multi-SIM smartphones to enhance your 5G experience, Nov. 18, 2019, https://www.qualcomm.com/news/onq/2019/11/18/multi-sim-smartphones-enhance-your-5g-experience, pp. 1-7.

Android Central, What is dual 4G LTE, and why should you care? 3 Pages, Downloaded From https://www.androidcentral.com/what-dual-4g-lte-and-why-should-you-care, dated Jul. 5, 2018.

Mediatek, Dual SIM, Dual 4G VoLTE Smartphones, https://www.mediatek.com/features/dual-4g-volte, 3 Pages, Downloaded Sep. 17, 2019.

Official Android Blog: Android 5.1: Unwrapping a new Lollipop update, pp. 1-3, dated Mar. 9, 2015, https://android.googleblog.com/2015/03/android-51-unwrapping-new-lollipop.html.

Verizon Wireless, Apple® iPhone®—Turn Voice & Data On / Off—HD Voice, https://www.verizonwireless.com/support/knowledge-base-206984/, 3 Pages, Downloaded Sep. 17, 2019.

Daoud et al., "On The Performance of CBRS Fixed Wireless Access: Coverage And Capacity Field Study", Sep. 2019, 41 pages, https://www.nctatechnicalpapers.com/Paper/2019/2019-on-the-performance-of-cbrs-fixed-wireless-access.

3rd Generation Partnership Project (3GPP), Technical Specification (TS) Group Services and System Aspects, "General Packet Radio Service (GPRS) enhancements for Evolved Universal Terrestrial Radio Access Network E-UTRAN) access", TS 23.401 V16.5.0, Dec. 2019, 423 pages, http://www.3gpp.org/ftp//Specs/archive/23_series/23.401/23401-g30.zip.

The Software Defined Radio Forum Inc., Spectrum Sharing Committee Work Group 1 (WG1), "CBRS Operational and Functional Requirements", WINNF-TS-0112-V1.9.0, Dec. 2019, 81 pages, https://winnf.memberclicks.net/assets/CBRS/WINNF-TS-0112.pdf.

CBRS Alliance, "CBRS Network Services Use Cases and Requirements", CBRSA-TS-1001 V2.0.0, Dec. 2018, 37 pages, https://www.cbrsalliance.org/wp-content/uploads/2018/12/CBRSA-TS-1001-V2.0.0_Published-December-112c-2018.pdf.

CBRS Alliance, "CBRS Network Services Stage 2 and 3 Specification", CBRSA-TS-1002 V2.0.0, Feb. 2019, 52 pages, https://www.cbrsalliance.org/wp-content/uploads/2019/04/CBRSA-TS-1002-V2.0.0_Published-April-5-2019.pdf.

* cited by examiner

DATA TRANSFER USING A DUAL SIM PHONE

FIELD OF THE INVENTION

The present invention relates generally to the electrical, electronic, and computer arts, and more particularly relates to wireless telephony.

BACKGROUND OF THE INVENTION

Wireless telecommunications or radio access technologies (RATs) generally use licensed radio frequency spectrum for communications between mobile devices and wireless telecommunications networks. For example, licensed spectrum and unlicensed spectrum may be used for third generation (3G) and fourth generation (4G) wireless communications.

Citizens Broadband Radio Service (CBRS) spectrum is a type of unlicensed spectrum or shared spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of the CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference-limited network, which means that the performance of the network and the data sent to CBRS subscribers is limited by the amount of interference the CBRS users or subscribers experience in the frequency band of operation.

Dual subscriber identification module (SIM) devices are mobile devices which may simultaneously connect to networks using the licensed spectrum and the unlicensed spectrum. Consequently, a processor in the dual SIM devices may perform tasks related to both connections in addition to other radio resource management tasks.

SUMMARY OF THE INVENTION

Techniques are provided for utilizing a dual SIM device to transfer data, which, in one or more embodiments, is capable of utilizing both SIMs to transfer data and control information in a coordinated manner.

In one aspect, an exemplary method includes the operations of connecting a first SIM of the dual SIM device to a network; informing a small cell that the dual SIM device is a dual SIM-type device; attaching a first radio frequency device of the dual SIM device to the network; attaching a second radio frequency device of the dual SIM device to the network; configuring the small cell to treat a second SIM as a control SIM and to treat the first SIM a data SIM; transferring user data to the first radio frequency device; sending a control channel switch command to the dual SIM device; and transferring control information to the second radio frequency device.

In one aspect, a non-transitory computer readable medium comprises computer executable instructions which when executed by a processor of a dual subscriber identification module (SIM) device cause the processor to perform operations comprising connecting a first SIM of the dual SIM device to a network; informing a small cell that the dual SIM device is a dual SIM-type device; attaching a first radio frequency device of the dual SIM device to the network; attaching a second radio frequency device of the dual SIM device to the network; configuring the small cell to treat a second SIM as a control SIM and to treat the first SIM a data SIM; transferring user data to the first radio frequency device; sending a control channel switch command to the dual SIM device; and transferring control information to the second radio frequency device.

In one aspect, a dual SIM device comprises a first SIM and a second SIM; a memory; and at least one processor coupled to the memory, the at least one processor coupled to the memory and in data communication with the control and data separation module, the first subscriber identification module (SIM), and the second subscriber identification module (SIM); wherein the at least one processor coupled to the memory, the control and data separation module, the first subscriber identification module (SIM), and the second subscriber identification module (SIM) are cooperatively configured to perform operations comprising: connecting the first SIM of the dual SIM device to a network; informing a small cell that the dual SIM device is a dual SIM-type device; attaching a first radio frequency device of the dual SIM device to the network; attaching a second radio frequency device of the dual SIM device to the network; configuring the small cell to treat the second SIM as a control SIM and to treat the first SIM a data SIM; transferring user data to the first radio frequency device; sending a control channel switch command to the dual SIM device; and transferring control information to the second radio frequency device.

In one aspect, a system for transferring information in a dual data mode comprises: a network; one or more one dual subscriber identification module (SIM) devices; and at least one base station, each base station comprising a look-up table for identifying dual subscriber identification module (SIM) devices that are connected, via the network, to the base station corresponding to the look-up table.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a dual SIM device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module (s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

coordinated use of SIMs in dual SIM devices for data transfer;

increased quality of service and quality of user experience for subscribers;

low data transmission latency which improves the quality of service delivered to subscribers;

increased security through the use separate transmission of the control channel;

better control channel coverage due to separation of data and control channels; and increased data bandwidth by dedicating a SIM of the dual SIM device to user data.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
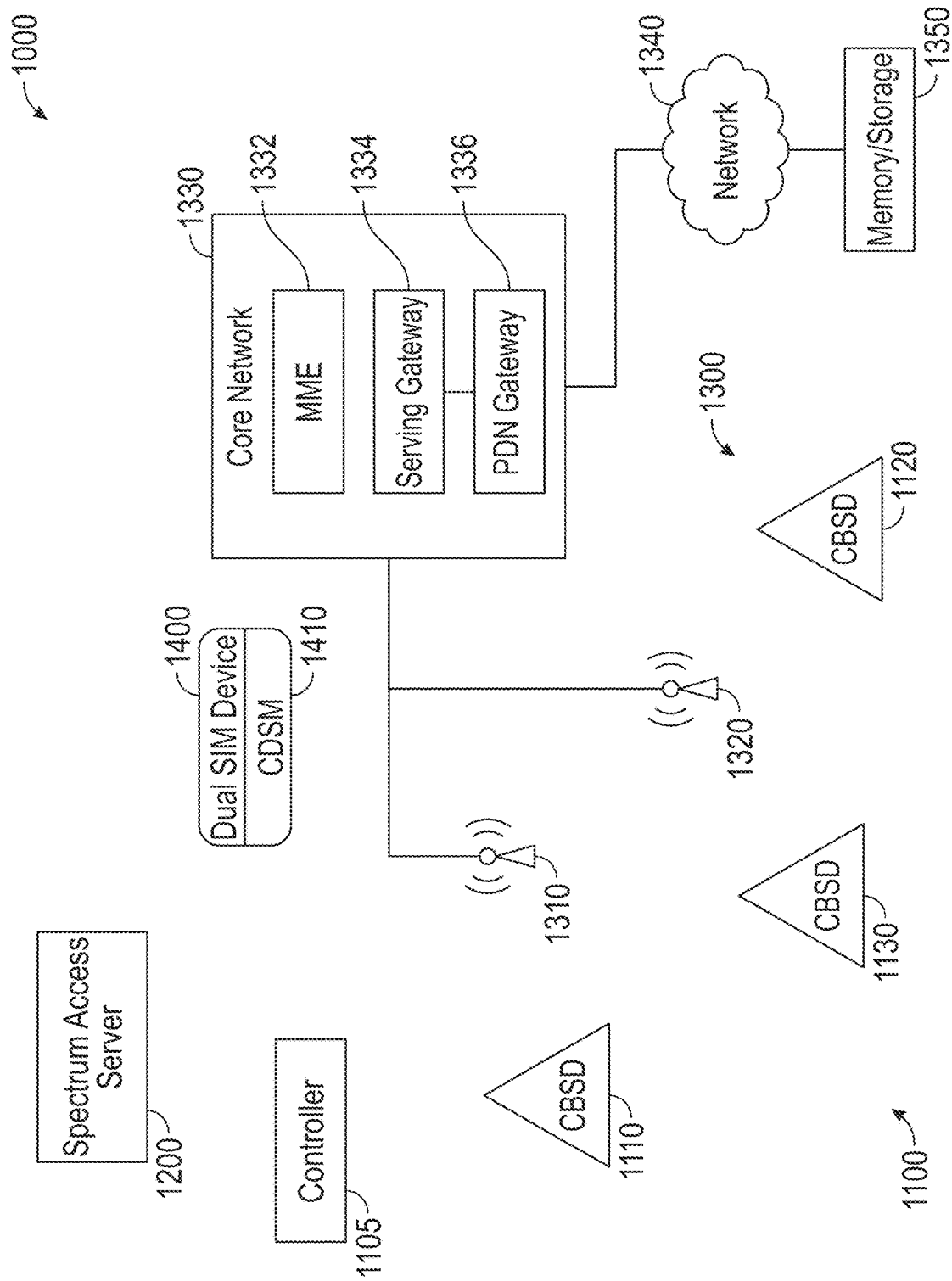
FIG. 1 is a diagram of an example citizens broadband radio service (CBRS) network and a licensed spectrum with dual subscriber identification module (SIM) devices, in accordance with an example embodiment.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems using a subscriber identification module (SIM) radio controller when dual SIM devices are connected to a network. In one example embodiment, the unlicensed spectrum may be a Citizens Broadband Radio Service (CBRS) spectrum which is controlled by a spectrum access system (SAS). In one example embodiment, the radio controller may be implemented in one SIM of the dual SIM device. In one example embodiment, the radio controller may run as part of the dual SIM device operating system. In one example embodiment, the radio controller may run as part of the kernel software on the dual SIM device. In one example embodiment, the radio controller may be provided on the dual SIM device as firmware. The method may improve user experience when using the CBRS spectrum for data and voice connectivity and communications. In one example embodiment, a service provider may provision the dual SIM device with one SIM for operation with control information and one SIM for operation with user data. It is worth noting that embodiments are not limited to CBRS.

In one example embodiment, the SIM radio controller may scan available networks including CBRS Devices (CBSD) and base stations, connect to a network based on a set of parameters, run voice and data applications, and manage paging and network messages. In one example embodiment, the set of parameters may include signal strength of the network, available capacity of the network, number of users in the network, and required QoS for data, voice, and other applications. In one example embodiment, the SIM radio controller may proactively check a current network connection and potential connections to ensure connectivity and QoS performance.

FIG. 1 is a diagram of an example citizens broadband radio service (CBRS) network 1100 and a licensed spectrum with dual subscriber identification module (SIM) devices, in accordance with an example embodiment. In one example embodiment, an architecture 1000 includes a CBRS network 1100 which provides wireless coverage. The CBRS network 1100 includes CBSDs 1110, 1120, and 1130. In one example embodiment, the CBSDs 1110, 1120, and 1130 form a cluster that is controlled by a controller 1105. The number of clusters and the number of CBSDs is illustrative and the architecture 1000 may include more or fewer clusters and each cluster may include more or fewer CBSDs. The architecture 1000 includes an SAS 1200 which is connected to or in communication (collectively "in communication with") with each of the CBSDs 1110, 1120, and 1130, or the controller 1105 when appropriate.

In one example embodiment, the architecture 1000 includes a licensed spectrum network 1300 which provides wireless coverage. The licensed spectrum network 1300 includes base stations 1310 and 1320. The number of base stations is illustrative and the architecture 1000 may include more or fewer base stations. The base stations 1310 and 1320 are in communication with a core network 1330, which includes a mobility management entity (MME) 1332, a serving gateway 1334, and a packet data network (PDN) gateway 1336. The core network 1330 is in communication with a network 1340, which includes, for example, the Internet, and which is in communication with a memory/storage 1350.

A dual SIM device 1400 is in communication with one of the CBSDs 1110, 1120, and 1130, and/or one of the base stations 1310 and 1320. The dual SIM device 1400 includes a control and data separation module (CDSM) 1410, as described more fully below in conjunction with FIGS. 4-6. The communications between the dual SIM device 1400, particular CBSDs 1110, 1120, and 1130, the SAS 1200, the controller 1105 when applicable, particular base stations 1310 and 1320, the core network 1330, the network 1340, and the memory/storage 1350, as appropriate and applicable, include, for example, wired communications, wireless communications, or a combination thereof. In one example embodiment, the architecture 1000 executes the techniques described in FIG. 7C. The architecture 1000 is illustrative and may include additional, fewer or different devices, entities, and the like which may be similarly or differently architected without departing from the scope of the specification and claims herein. Moreover, the illustrated devices may perform other functions without departing from the scope of the specification and claims herein.

The CBSDs 1110, 1120, and 1130 can include a base station, an access point, an access node, or like device which enables radio communications access between, for example, the dual SIM device 1400 and other devices. Each CBSD 1110, 1120, and 1130 can, for example, be authorized and granted spectrum allocation by the SAS 1200 (which can be communicated via the controller 1105, for example). Each CBSD 1110, 1120, and 1130 can, for example, have sectors which provide wireless communications coverage. In one or more embodiments, a database and lookup table are included as part of the CBSD software.

The base stations 1310 and 1320 can include, for example, a node-B, an evolved node-B, an access point, an access node or like device which enables radio communications access between, for example, the dual SIM device 1400 and other devices. Each base station 1310 and 1320 can, for example, have sectors which provide wireless communications coverage. In one example embodiment, the base stations 1310 and 1320 include a database that includes a device look-up table (e.g., in a persistent storage of a computing device such as described with respect to FIG. 8). The device look-up table includes an identifier for each device connected with the corresponding base station 1310, 1320, an indication of whether the corresponding device has dual SIM devices, and an indication of whether the corresponding device is operating in the dual data mode, as described more fully below. The information in the device look-up table may be utilized to allocate network bandwidth to the base stations 1310 and 1320 based on the type of devices connected to the corresponding base station 1310 and 1320 and the mode of operation of the device, such as the dual data mode.

In one example embodiment, the CBSDs 1110, 1120, and 1130 are owned and operated by the service provider, and the base stations 1310 and 1320 are owned by a multiple systems operator (MSO) and operated by the service provider. That is, the CBRS network 1100 and the licensed spectrum network 1300 are operated by the same service provider. Other embodiments can have different ownership and/or operating arrangements.

The dual SIM device 1400 includes, by way of example but not limitation, end user devices, cellular telephones, Internet Protocol (IP) devices, mobile computers, laptops, handheld computers, PDAs, personal media devices, smartphones, notebooks, notepads, phablets and the like which include two SIMs and at least one radio. In one or more embodiments, one SIM of the dual SIM device 1400 is provisioned for operation with the CBRS network 1100 and the other SIM is provisioned for operation with the licensed spectrum network 1300. Although, both SIMs could be provisioned to work with CBRS, one or more embodiments use one SIM only for data and other SIM only for control information.

The SAS 1200 enables access to the CBRS spectrum and dynamically manages the spectrum for optimal use, efficiency, and compliance with CBRS rules. The SAS 1200 communicates with each CBSD for registration, grant allocation/deallocation and interference management. In some instances, the SAS 1200 performs interference analysis based on power measurements.

Operationally, and as described in detail hereinbelow, the SAS 1200 grants spectrum to each activated CBSD, such as the CBSDs 1110, 1120, and 1130 and establishes a wireless coverage of CBRS network 1100. In one example embodiment, the communication is via the controller 1105. Base stations 1310 and 1320 establish a wireless coverage of licensed spectrum network 1300.

A dual SIM device, i.e., the dual SIM device 1400 can be connected to a CBSD, such as CBSDs 1110, 1120, and 1130, using, for example, a first radio. A SIM level task scheduler, which can be implemented in a CBRS provisioned SIM of the dual SIM device 1400 or can be implemented in the dual SIM device 1400, creates an inventory of services running on the dual SIM device 1400 and determines QoS levels for each service. The SIM radio controller initiates scanning of other CBSDs 1110, 1120, and 1130 and base stations 1310 and 1320 to determine signal strengths. In one example embodiment, the signal strength measurements are performed by the SIM that is not being used. The signal strengths can, for example, be Reference Signal Received Power (RSRP), Reference Signal Received Quality (RSRQ), or other power measurement metrics. The SIM radio controller saves network connection measurements that are stronger than a current network connection plus a defined delta or offset. This can, for example, be saved by the SIM radio controller in the dual SIM device 1400.

The dual SIM device 1400 can, at the behest of the SIM radio controller, measure real-time QoS being experienced by the dual SIM device 1400. In one example embodiment, the measurements are done using the connected SIM and radio. The SIM radio controller then compares the measured QoS against a required QoS.

The SIM radio controller directs a second radio, for example, to connect to a second network, such as, for example, the licensed spectrum network 1300 via base stations 1310 and 1320 and can share the first radio settings with the second radio. The second radio can share the first radio settings with licensed spectrum network 1300, for example. A core network 1330 of the licensed spectrum network 1300 starts fetching data from the Internet 1340 and memory/storage 1350 based on the consumed traffic in the first radio, for example. The fetched data is cached, for example, at one of the base stations 1310 and 1320.

Figure 2:
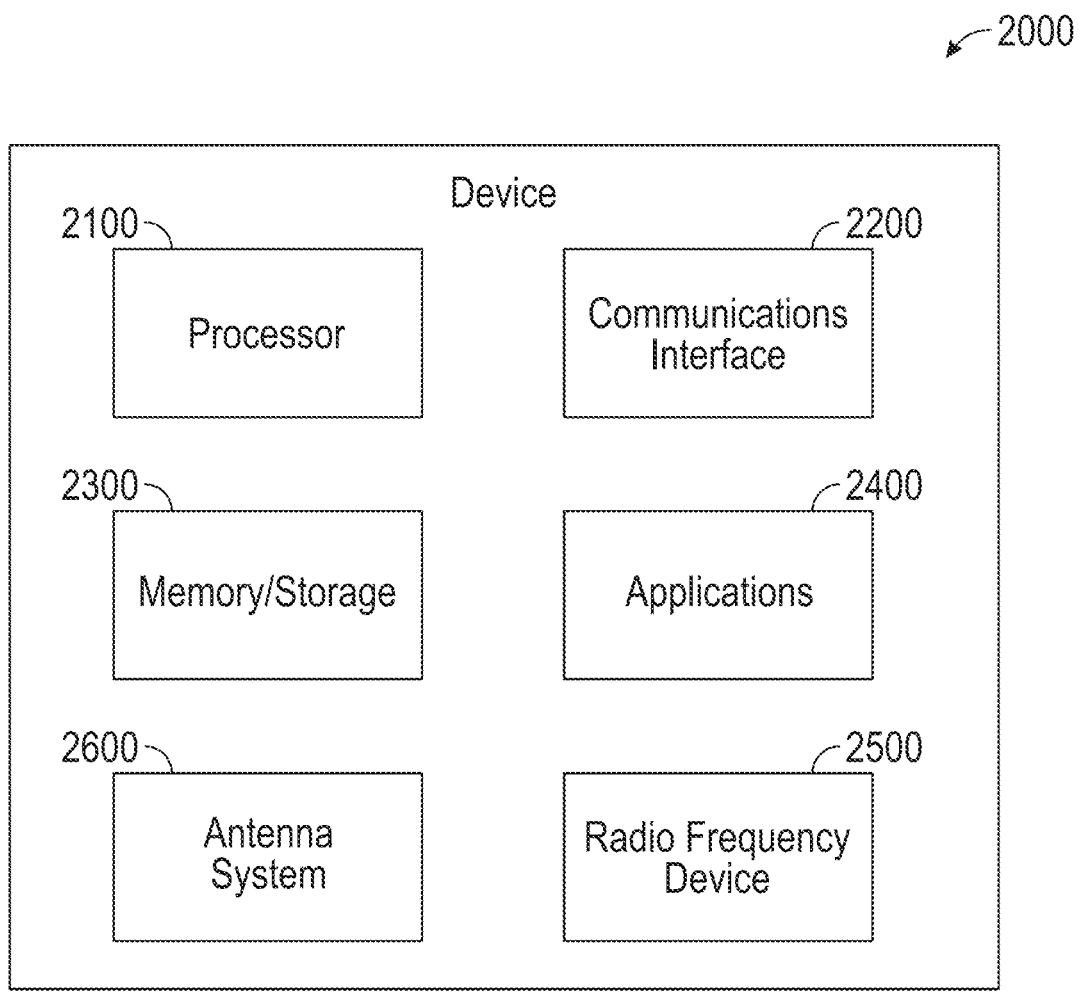
FIG. 2 is a block diagram of an example of a CBRS device (CBSD), in accordance with an example embodiment.

FIG. 2 is a block diagram of an example device 2000, in accordance with an example embodiment. The device 2000 includes, but is not limited to, a processor 2100, a memory/storage 2300, a communication interface 2200, applications 2400, a radio frequency device 2500, and an antenna system 2600. In one example embodiment, the communication interface 2200 includes a fiber optic port for connecting to the Internet. The device 2000 can include or implement, for example, any of the CBSDs 1110, 1120, and 1130, and the base stations 1310 and 1320 using the antenna system 2600. In one example embodiment, the memory/storage 2300 caches the data prior to sending to a new network connection. The applicable or appropriate SIM radio controller techniques or methods using dual SIM devices as described herein are stored in the memory/storage 2300 and executed by the processor 2100 in cooperation with the memory/storage 2300, the communications interface 2200, the applications 2400, and the radio frequency device 2500 as appropriate. The device 2000 may include other elements which may be desirable or necessary to implement the devices, systems, compositions and methods described herein (e.g. bus or other coupling) but the same will be apparent to the skilled artisan, given the teachings herein, and are omitted to avoid clutter.

Figure 3:
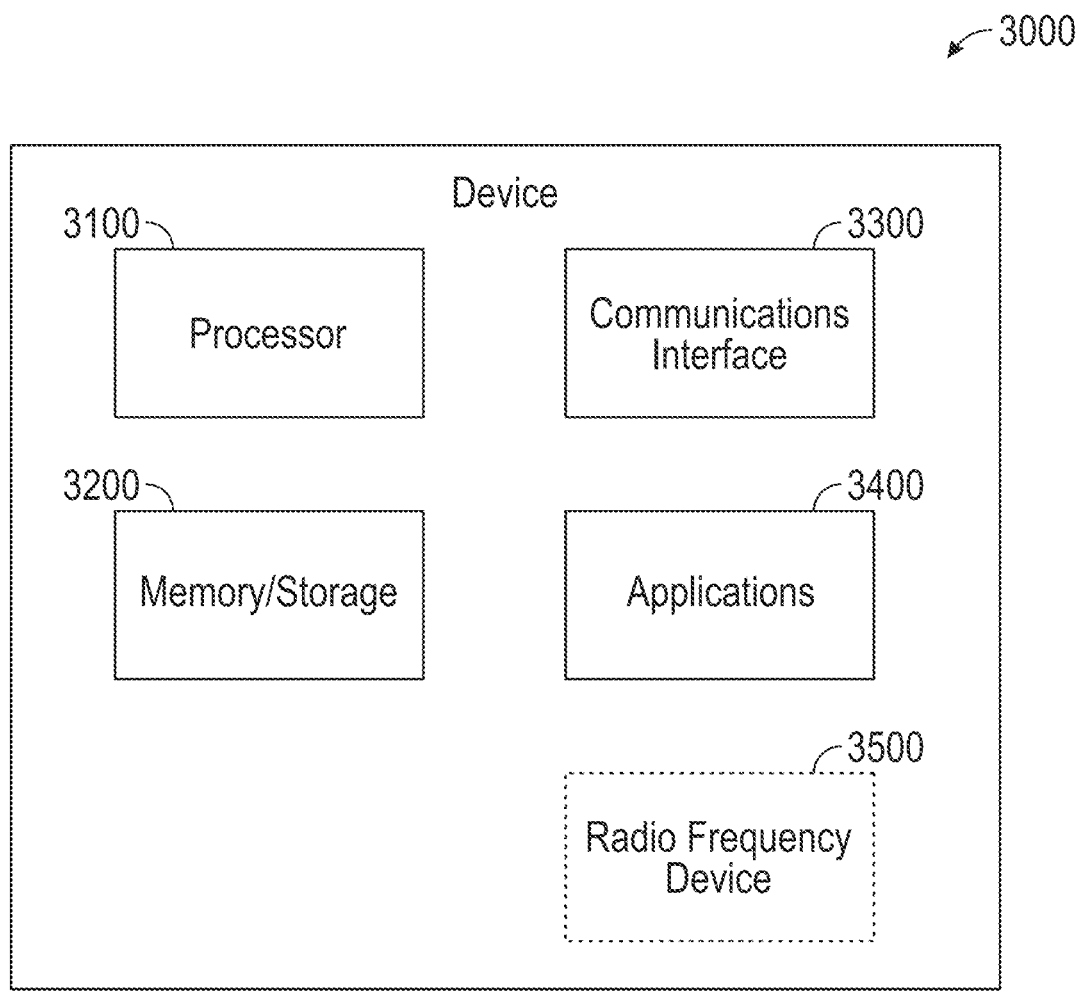
FIG. 3 is a block diagram of an example of a device, in accordance with an example embodiment.

FIG. 3 is a block diagram of an example device 3000, in accordance with an example embodiment. The device 3000 includes, but is not limited to, a processor 3100, a memory/storage 3200, a communication interface 3300, and applications 3400. In one example embodiment, the communication interface 3300 includes a fiber optic port for connecting to the Internet. In an exemplary implementation, the device 3000 includes a radio frequency device 3500. The device 3000 can include or implement, for example, the controller 1105 and the SAS 1200. In an implementation, the memory/storage 3200 stores the interference map, spectrum allocations, and other information. The applicable or appropriate SIM radio controller techniques or methods using dual SIM devices as described herein are stored in the memory/storage 3200 and executed by the processor 3100 in cooperation with the memory/storage 3200, the communications interface 3300, the applications 3400, and the radio frequency device 3500 (when applicable) as appropriate. The device 3000 may include other elements which may be desirable or necessary to implement the devices, systems, compositions and methods described herein (e.g. bus or other coupling) but the same will be apparent to the skilled artisan, given the teachings herein, and are omitted to avoid clutter.

Figure 4:
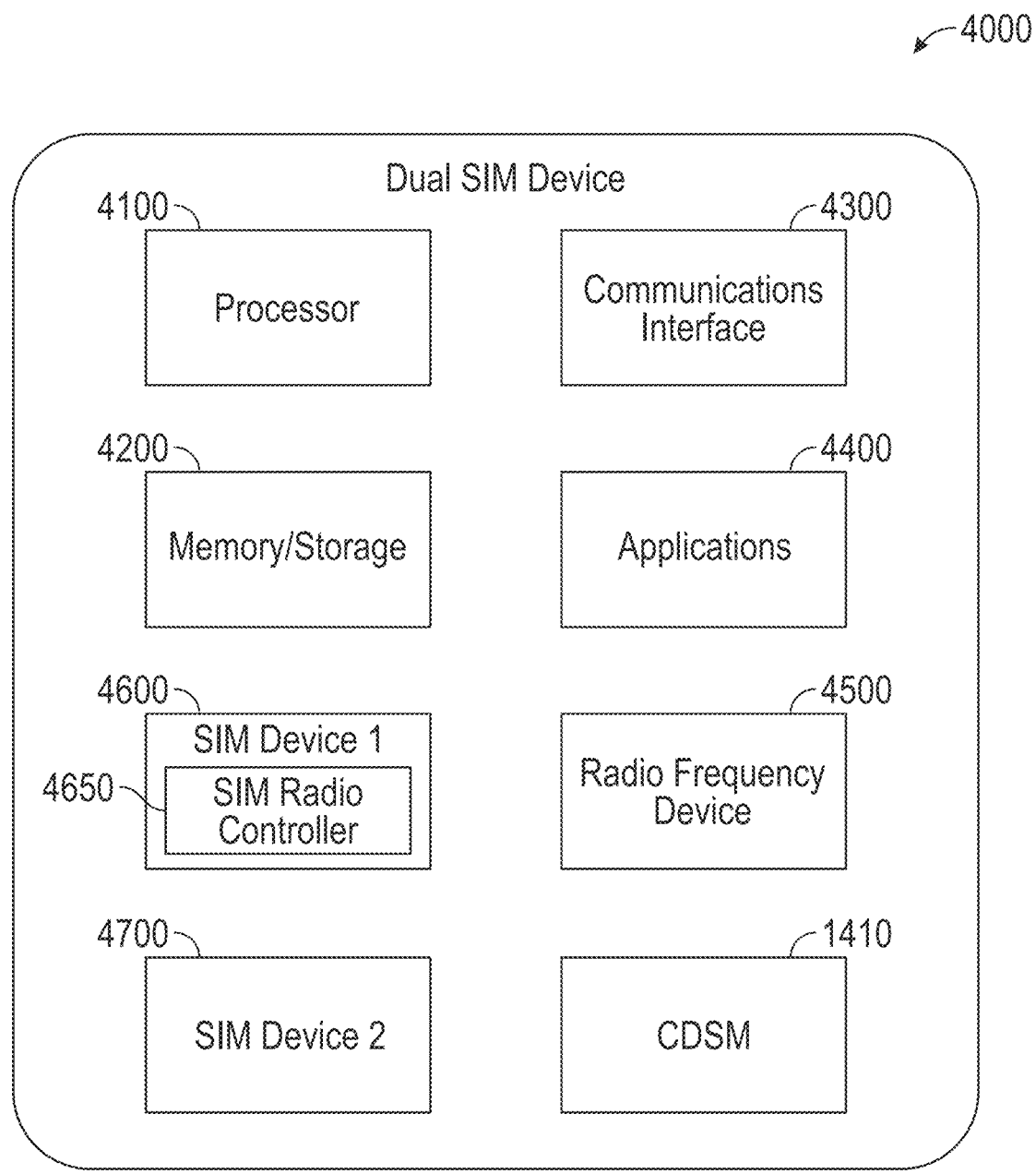
FIG. 4 is a block diagram of a first example of a dual SIM device, in accordance with an example embodiment.

FIG. 4 is a block diagram of a first example of a dual SIM device 4000, in accordance with an example embodiment. The device 4000 includes, but is not limited to, a processor 4100, a memory/storage 4200, a communication interface 4300, applications 4400, a radio frequency device 4500, a first SIM 4600, a SIM radio controller 4650, a second SIM 4700, and the control and data separation module 1410. The device 4000 can include or implement, for example, the dual SIM device 1400 including the control and data separation module 1410. In one example embodiment, the memory/storage 4200 stores the required QoS, measured QoS, user settings and the like. The applicable or appropriate SIM radio controller techniques or methods using dual SIM devices as described herein are stored in the memory/storage 4200 and executed by the SIM radio controller 4650 and the processor 4100 in cooperation with the memory/storage 4200, the communications interface 4300, the applications 4400, the radio frequency device 4500, the first SIM 4600, and the second SIM 4700 as appropriate. In one example embodiment, the first SIM 4600 and the second SIM 4700 are provisioned for operation with unlicensed spectrum, CBRS spectrum or the like as operated by a service provider, or with another MSO. In one example embodiment, the first SIM 4600 and the second SIM 4700 operate on a time slotted basis with the radio frequency device 4500. In one example embodiment, the SIM radio controller 4650 is implemented as a combination of software and firmware as part of the first SIM 4600. In one example embodiment, the SIM radio controller 4650 is implemented as a combination of software and firmware as part of the second SIM 4700. In one example embodiment, SIM radio controller 4650 is implemented as a combination of software and firmware as part of the SIM provisioned for operation with the unlicensed spectrum. In one example embodiment, the SIM radio controller 4650 is implemented as a combination of software and firmware as part of the SIM provisioned for operation with the CBRS spectrum. In one example embodiment, the control and data separation module 1410 is implemented as a combination of software and hardware, and manages and coordinates the transmission and reception of data using one of the SIMs 4600, 4700 and the transmission and reception of control information using the other of the SIMs 4600, 4700. In one example embodiment, the control and data separation module 1410 is implemented as software running on the processor 4100 and/or the SIM radio controller 4650, using the memory/storage 4200, the communication interface 4300, the applications 4400, and the radio frequency device 4500. The SIM radio controller 4650 and the control and data separation module 1410 implement the methods and techniques described herein, such as for example, with respect to FIGS. 7A-7C. The device 4000 can include other elements which may be desirable or necessary to implement the devices, systems, compositions and methods described herein (e.g. bus or other coupling) but the same will be apparent to the skilled artisan, given the teachings herein, and are omitted to avoid clutter.

Figure 5:
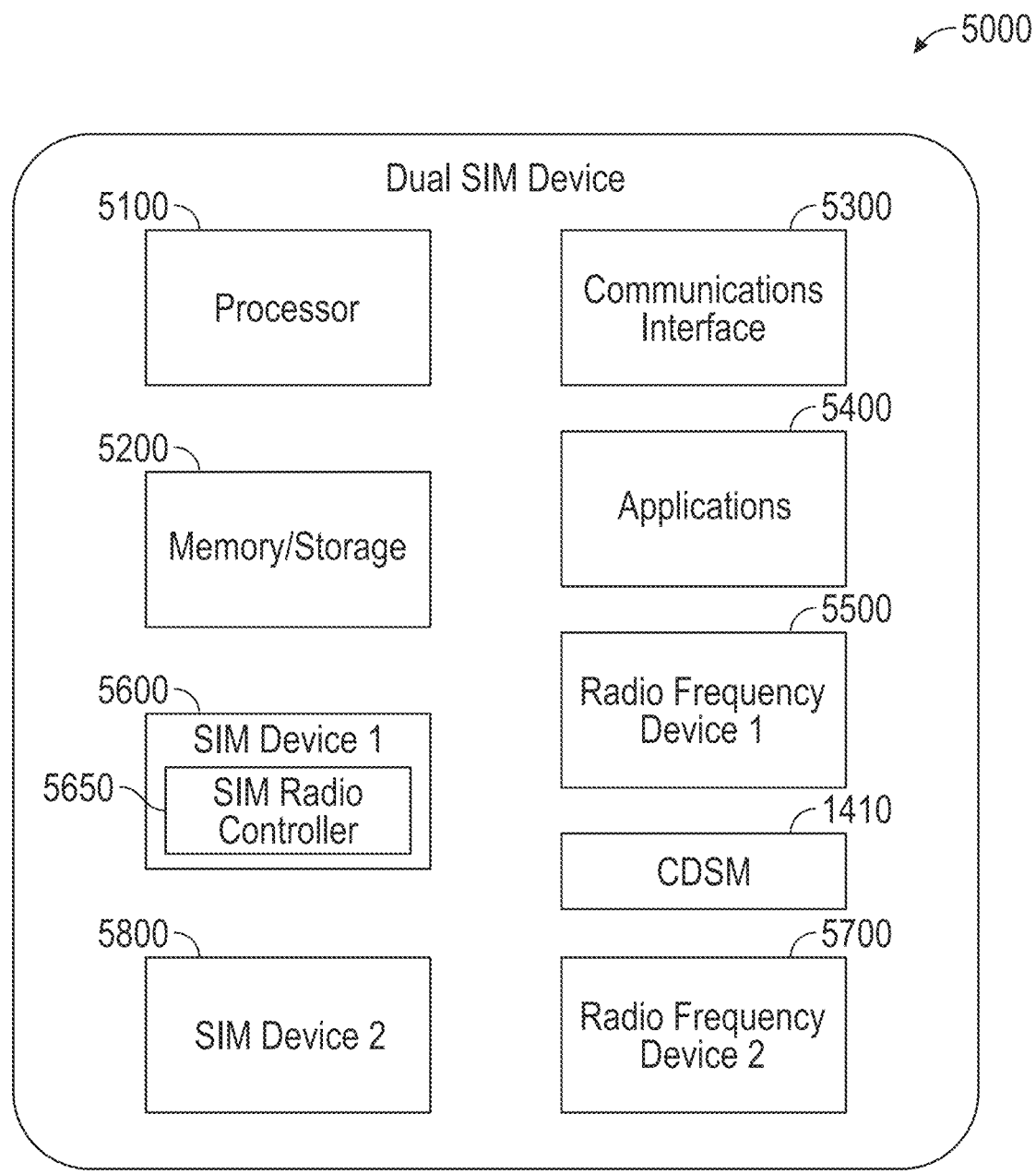
FIG. 5 is a block diagram of a second example of a dual SIM device, in accordance with an example embodiment.

FIG. 5 is a block diagram of a second example of a dual SIM device 5000, in accordance with an example embodiment. The device 5000 includes, but is not limited to, a processor 5100, a memory/storage 5200, a communication interface 5300, applications 5400, a first radio frequency device 5500, a first SIM 5600, a SIM level task scheduler or SIM radio controller 5650, a second radio frequency device 5700, a second SIM 5800, and the control and data separation module 1410. The device 5000 can include or implement, for example, the dual SIM device 1400 including the control and data separation module 1410. In one example embodiment, the memory/storage 5200 stores the required QoS, measured QoS, user settings and the like. The applicable or appropriate SIM radio controller techniques or methods using dual SIM devices as described herein are stored in the memory/storage 5200 and executed by the SIM radio controller 5650 and the processor 5100 in cooperation with the memory/storage 5200, the communications interface 5300, the applications 5400, the first radio frequency device 5500, the first SIM 5600, the second radio frequency device 5700, and the second SIM 5800 as appropriate. In one example embodiment, the first SIM 5600 is provisioned for operation with unlicensed spectrum, CBRS spectrum or the like as operated by a service provider, and the second SIM 5800 is provisioned with another MSO or the like but operated by the service provider. In one example embodiment, the first SIM 5600 operates with the first radio frequency device 5500 and the second SIM 5800 operates with the second radio frequency device 5700. In one example embodiment, the SIM radio controller 5650 is implemented as a combination of software and firmware as part of the first SIM 5600; alternatively, the SIM radio controller 5650 is implemented as a combination of software and firmware as part of the SIM provisioned for operation with the unlicensed spectrum, or the SIM radio controller 5650 is implemented as a combination of software and firmware as part of the SIM provisioned for operation with the CBRS spectrum. In one example embodiment, the control and data separation module 1410 is implemented as a combination of software and firmware, and manages and coordinates the transmission and reception of data using one of the SIMs 5600, 5800 and the transmission and reception of control information using the other of the SIMs 5600, 5800. In one example embodiment, the control and data separation module 1410 is implemented as software running on the processor 5100 and/or the SIM radio controller 5650, using the memory/storage 5200, the communication interface 5300, the applications 5400, the first radio frequency device 5500, and the second radio frequency device 5700. The SIM radio controller 5650 and the control and data separation module 1410 may implement the methods and techniques described herein, such as for example, with respect to FIGS. 7A-7C. The device 5000 can include other elements which may be desirable or necessary to implement the devices, systems, compositions and methods described herein (e.g. bus or other coupling) but the same will be apparent to the skilled artisan, given the teachings herein, and are omitted to avoid clutter.

Figure 6:
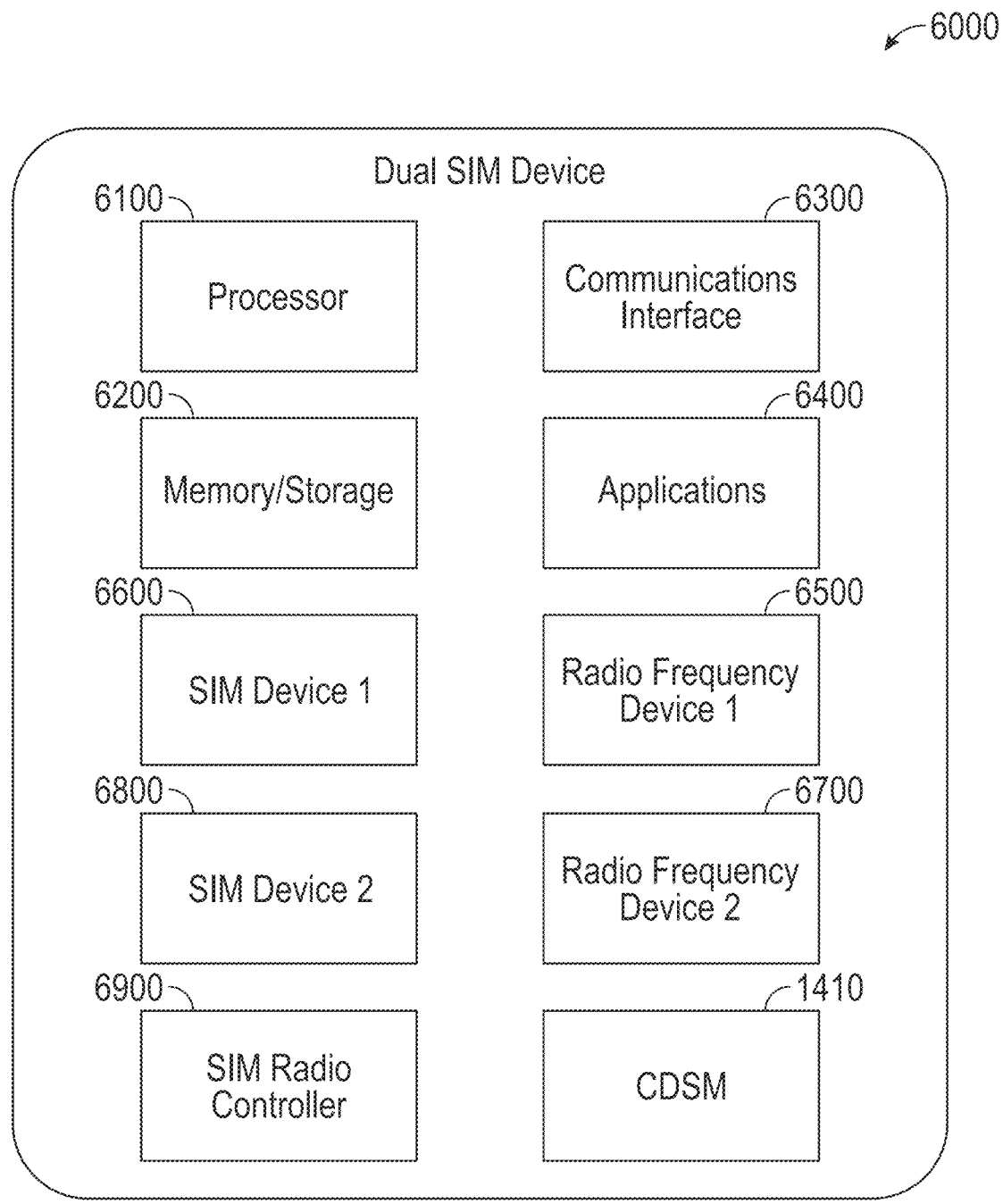
FIG. 6 is a block diagram of a third example of a dual SIM device, in accordance with an example embodiment.

FIG. 6 is a block diagram of a third example of a dual SIM device 6000, in accordance with an example embodiment. The device 6000 includes, but is not limited to, a processor 6100, a memory/storage 6200, a communication interface 6300, applications 6400, a first radio frequency device 6500, a first SIM 6600, a second radio frequency device 6700, a second SIM 6800, the control and data separation module 1410, and a SIM radio controller 6900. The device 6000 can include or implement, for example, the dual SIM device 1400 including the control and data separation module 1410. In one example embodiment, the memory/storage 6200 stores the required QoS, measured QoS, user settings and the like. The applicable or appropriate SIM radio controller techniques or methods using dual SIM devices as described herein are stored in the memory/storage 6200 and executed by the SIM radio controller 6900 and the processor 6100 in cooperation with the memory/storage 6200, the communications interface 6300, the applications 6400, the first radio frequency device 6500, the first SIM 6600, the second radio frequency device 6700, and the second SIM 6800 as appropriate. In one example embodiment, the first SIM 6600 is provisioned for operation with unlicensed spectrum, CBRS spectrum or the like as operated by a service provider, and the second SIM 6700 is provisioned with another MSO or the like but operated by the service provider. In one example embodiment, the first SIM 6600 operates with the first radio frequency device 6500 and the second SIM 6800 operates with the second radio frequency device 6700. In one example embodiment, the SIM radio controller 6900 is implemented as a combination of software and firmware as part of the dual SIM device. In one example embodiment, the control and data separation module 1410 is implemented as a combination of software and hardware, and manages and coordinates the transmission and reception of data using one of the SIMs 6600, 6800 and the transmission and reception of control information using the other of the SIMs 6600, 6800. In one example embodiment, the control and data separation module 1410 is implemented as software running on the processor 6100 and/or the SIM radio controller 6900, using the memory/storage 6200, the communication interface 6300, the applications 6400, the first radio frequency device 6500, and the second radio frequency device 6700. The SIM radio controller 6900 and the control and data separation module 1410 implement the methods and techniques described herein, such as for example, with respect to FIGS. 7A-7C. The device 6000 can include other elements which may be desirable or necessary to implement the devices, systems, compositions and methods described herein (e.g. bus or other coupling) but the same will be apparent to the skilled artisan, given the teachings herein, and are omitted to avoid clutter.

In one example embodiment, both SIMs are connected to the same network, the same Public Land Mobile Network (PLMN), the same sector, and the same frequency band, and each SIM is used for a different channel: either a data channel or a control channel. One SIM is used to transfer control information to and from the dual SIM device 1400 and the other SIM is used to transfer user data to and from the dual SIM device 1400. Since the SIMs are able to communicate with each other, the SIM for the control channel can send data to the SIM for the user data, and vice versa.

In LTE, information is transmitted to the SIM devices in a resource grid format. The control information, which describes the location of user data inside the recourse grid that is sent via the Physical Downlink Shared Channel (PDSCH), is signaled to the SIM device with the Physical Downlink Control Channel (PDCCH). All resource grid resources sent to the radio of the data channel contain user data; thus, more user data is transmitted as the space conventionally dedicated to control information is used for user data. In addition, since control information is not transmitted all the time, once the control information is sent to the control SIM, the SIM for the control channel can be turned off. In one example embodiment, once the control information is sent to the control SIM, the SIM for the control channel is used to transfer user data, thereby further improving the total throughput of the device.

Figure 7A:
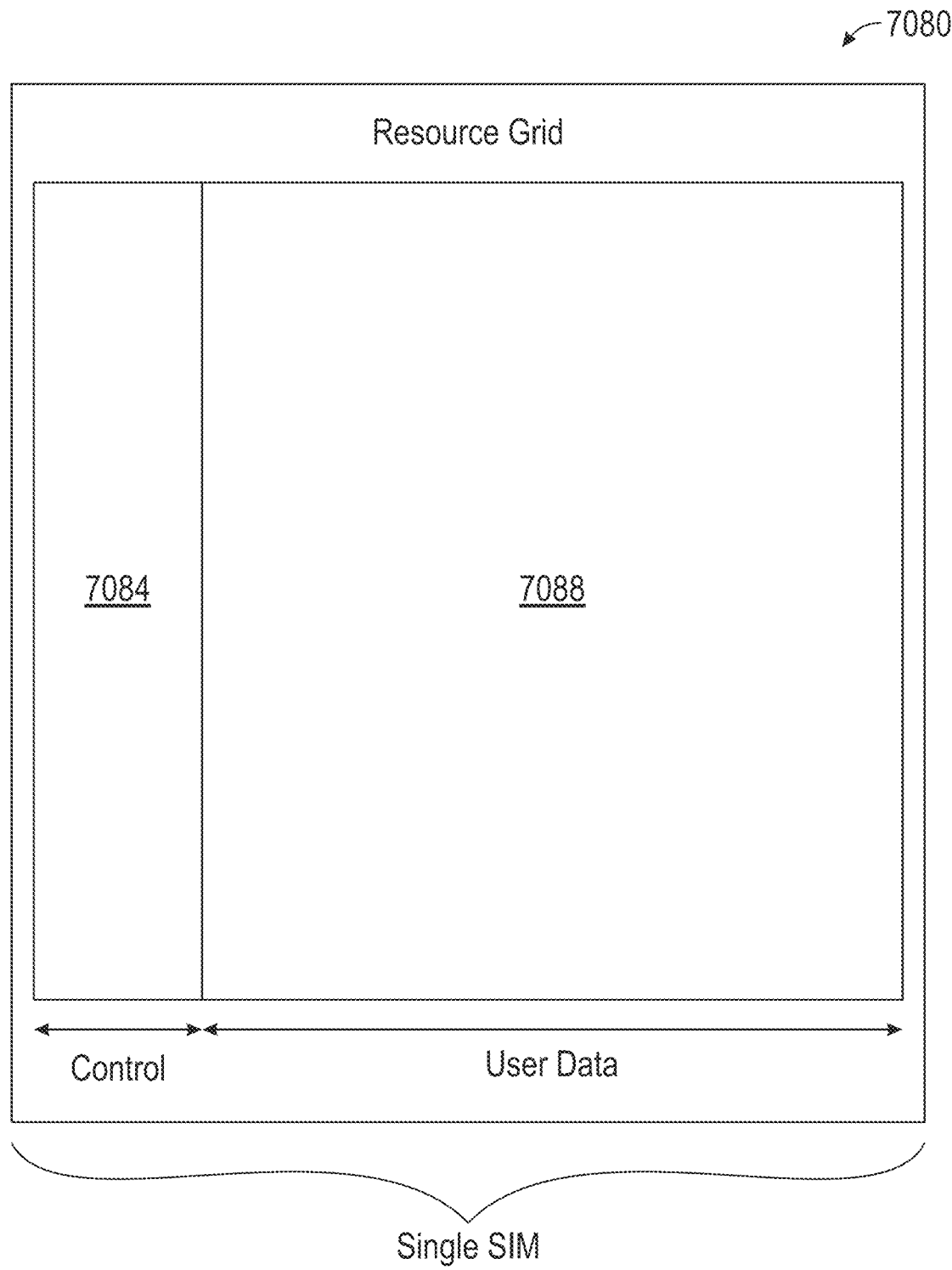
FIG. 7A shows a resource grid according to the prior art.
Figure 7B:
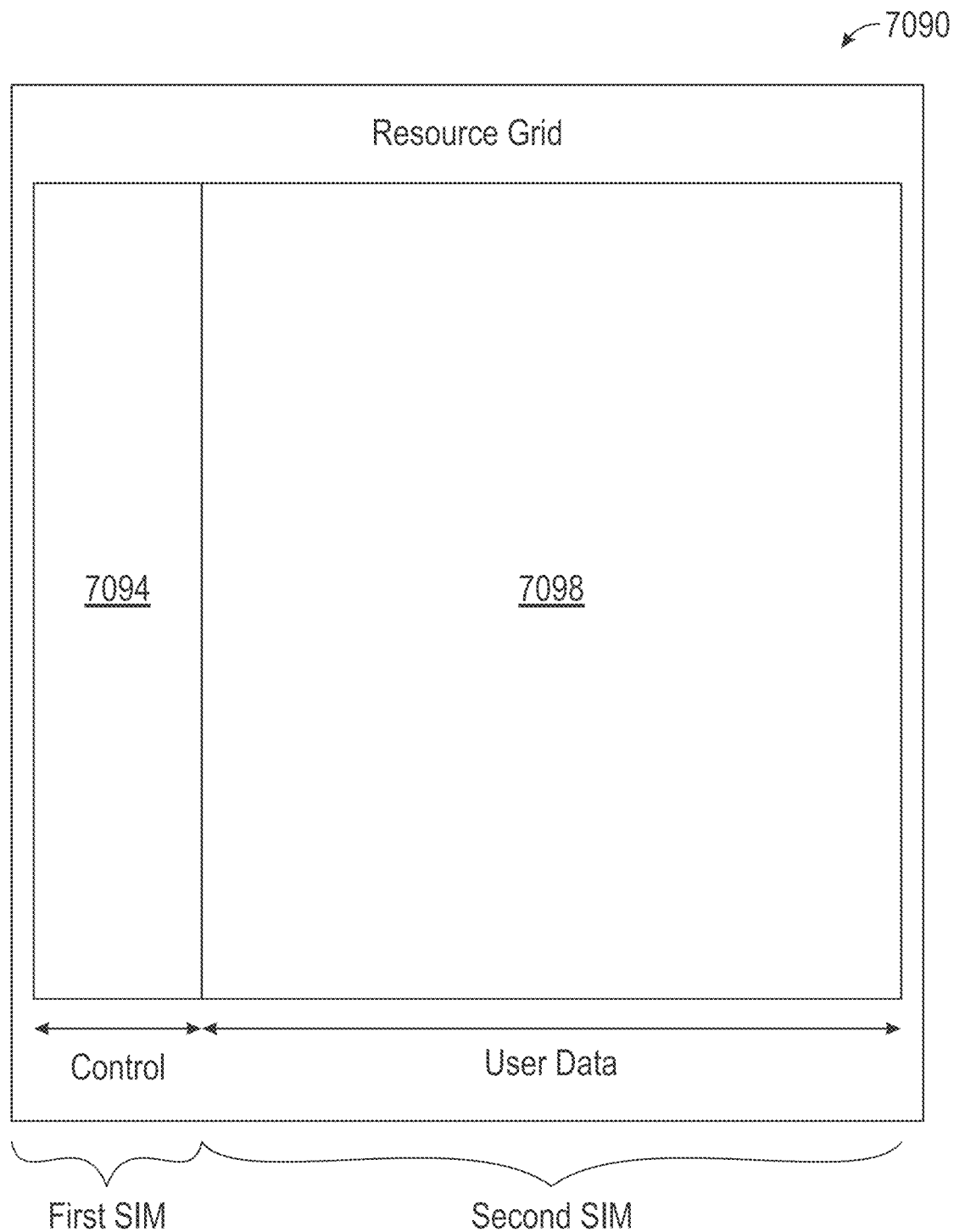
FIG. 7B shows a resource grid, in accordance with an example embodiment.

FIG. 7A shows a conventional resource grid 7080. FIG. 7B shows a dual-SIM resource grid 7090, in accordance with an example embodiment. As illustrated in FIG. 7A, control information is conventionally sent in a first portion 7084 of the resource grid 7080 and user data is conventionally sent in a second portion 7088 of the resource grid 7080. All of the data in the resource grid 7080 is handled by a single SIM. In one example embodiment, control information in a first portion 7094 of the resource grid 7090 is handled by a first SIM and user data sent in a second portion 7098 of the resource grid 7090 is handled by a second SIM. Thus, the bandwidth available for user data is increased.

Figure 7C:
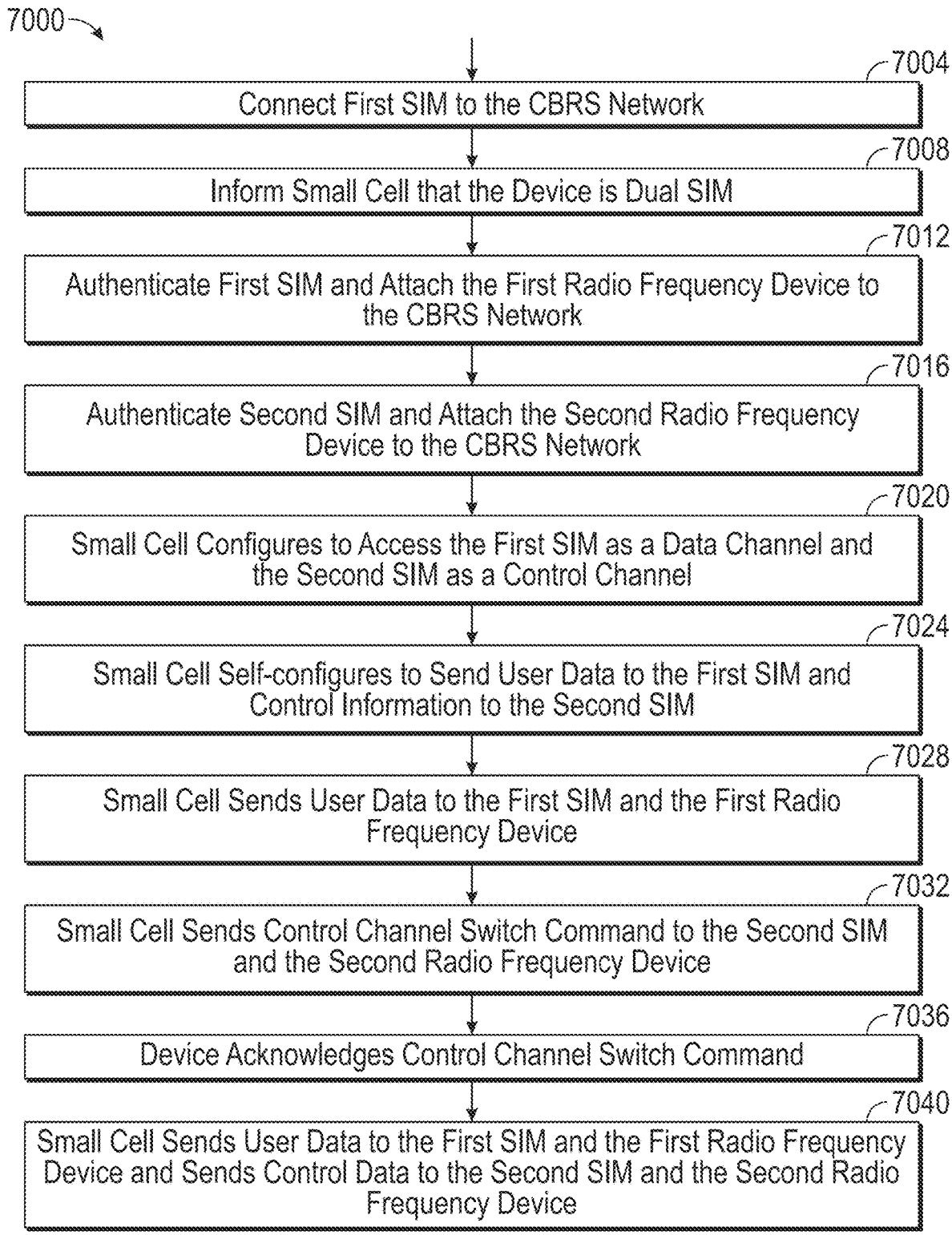
FIG. 7C presents a flowchart of an example workflow for techniques or methods for transferring data using dual SIM devices, in accordance with an example embodiment.

FIG. 7C is a flowchart of an example workflow 7000 for techniques or methods for transferring data using dual SIM devices, in accordance with an example embodiment. For illustrative purposes, the elements for FIG. 6 are referred to below, but the workflow 7000 could equally be implemented with the corresponding elements of FIG. 4 or 5. In one example embodiment, following a power-on phase, the first SIM 6600 of the device 6000 connects to the CBRS network 1100 (operation 7004) and informs the small cell that device 6000 is a dual SIM phone (operation 7008). The first SIM 6600 is authenticated and the first radio frequency device 6500 attaches to the CBRS network 1100 (operation 7012). While the first SIM 6600 of the device 6000 is connected to the CBRS network 1100, the second SIM 6800 is authenticated through the CBRS network 1100 and prepares to send and receive data (the second radio frequency device 6700 attaches to the CBRS network 1100) (operation 7016). Once the dual SIM authentication is completed, the second radio frequency device 6700 in the phone is turned on and attaches to the CBRS network 1100 using the same phone international mobile subscriber identity (IMSI) and international mobile equipment identity (IMEI) as the first radio frequency device 6500 (operation 7020). The small cell will recognize that there are two registrations with the same IMSI and IMEI, and will self-configure to treat the second SIM 6800 as a control SIM and to treat the first SIM 6600 a data SIM (or vice versa) (operation 7024). The small cell sends user data to the first radio frequency device 6500 associated with the first SIM 6600 (operation 7028) and the small cell sends a "Control Channel Switch" command to the device 6000, indicating that the phone should ask for the control information from the second radio frequency device 6700 since the small cell is configured to not send the control information to the first radio frequency device 6500 (operation 7032). After the device confirms the "Control Channel Switch" action (operation 7036), the control information is transferred via the second radio frequency device 6700 and the data is transferred via the first radio frequency device 6500 (operation 7040). This is referred to as the dual data mode herein. The phone will use the PDCCH and other control information transmitted to the control SIM (the second SIM 6800 and second radio frequency device 6700) to find the location of the data in the resource grid transmitted to the data SIM (the first SIM 6600 and the first radio frequency device 6500). In one or more embodiments, the application is unaware of the data transfer mechanism; the approach is application-agnostic. In some instances, a control channel switch command is used to stop the first SIM 6600 from receiving control channel information and for directing the second SIM 6800 to receive control channel information, and the second SIM 6800 is used to receive control channel information only. The second SIM 6800 confirms the 'control channel switch' by sending confirmation message as in FIG. 7C (operation 7036).

Given the discussion thus far, it will be appreciated that, an exemplary method for transferring data using a dual SIM device 6000 comprises connecting a first SIM 6600 of the dual SIM device 6000 to a network 1100 (operation 7004); informing a small cell that the dual SIM device 6000 is a dual SIM-type device (operation 7008); attaching a first radio frequency device 6500 of the dual SIM device 6000 to the network 1100 (operation 7012); attaching a second radio frequency device 6700 of the dual SIM device 6000 to the network 1100 (operation 7016); configuring the small cell to treat a second SIM 6800 as a control SIM and to treat the first SIM 6600 a data SIM (operations 7020 and 7024); transferring user data to the first radio frequency device 6500 (operations 7028 and 740); sending a control channel switch command to the dual SIM device 6000 (operation 7032); and transferring control information to the second radio frequency device 6700 (operation 7040).

In one aspect, a non-transitory computer readable medium comprises computer executable instructions which when executed by a processor of a dual subscriber identification module (SIM) device cause the processor to perform operations comprising connecting a first SIM 6600 of the dual SIM device 6000 to a network 1100 (operation 7004); informing a small cell that the dual SIM device 6000 is a dual SIM-type device (operation 7008); attaching a first radio frequency device 6500 of the dual SIM device 6000 to the network 1100 (operation 7012); attaching a second radio frequency device 6700 of the dual SIM device 6000 to the network 1100 (operation 7016); configuring the small cell to treat a second SIM 6800 as a control SIM and to treat the first SIM 6600 a data SIM (operations 7020 and 7024); transferring user data to the first radio frequency device 6500 (operations 7028 and 740); sending a control channel switch command to the dual SIM device 6000 (operation 7032); and transferring control information to the second radio frequency device 6700 (operation 7040).

In one aspect, a dual SIM device comprises a first SIM and a second SIM; a control and data separation module; a memory; and at least one processor coupled to the memory and in data communication with the control and data separation module, the first subscriber identification module (SIM), and the second subscriber identification module (SIM); wherein the at least one processor coupled to the memory, the control and data separation module, the first subscriber identification module (SIM), and the second subscriber identification module (SIM) are cooperatively configured to perform operations comprising: connecting a first SIM 6600 of the dual SIM device 6000 to a network 1100 (operation 7004); informing a small cell that the dual SIM device 6000 is a dual SIM-type device (operation 7008); attaching a first radio frequency device 6500 of the dual SIM device 6000 to the network 1100 (operation 7012); attaching a second radio frequency device 6700 of the dual SIM device 6000 to the network 1100 (operation 7016); configuring the small cell to treat the second SIM 6800 as a control SIM and to treat the first SIM 6600 a data SIM (operations 7020 and 7024); transferring user data to the first radio frequency device 6500 (operations 7028 and 740); sending a control channel switch command to the dual SIM device 6000 (operation 7032); and transferring control information to the second radio frequency device 6700 (operation 7040).

In one example embodiment, a location of the user data in a resource grid 7090 is determined based on the control information. In one example embodiment, a same phone international mobile subscriber identity (IMSI) is used for the first SIM 6600 and the second SIM 6800 and a same international mobile equipment identity (IMEI) is used for the first SIM 6600 and the second SIM 6800. In one example embodiment, the user data and the control information are transferred simultaneously for at least a portion of a transmission of the user data. In one example embodiment, the connecting of the first SIM 6600 of the dual SIM device 6000 to the network 1100 further comprises authenticating, by the network 1100, the first SIM 6600 (operation 7012).

In one example embodiment, the control and data separation module 1410 comprises software and the operations are performed by the processor 4100, 5100, 6100. In one example embodiment, the control and data separation module 1410 comprises software and the operations are performed by a separation processor of the control and data separation module 1410. In general, as used herein, when it is stated that the at least one processor coupled to the memory, the control and data separation module, the first subscriber identification module (SIM), and the second subscriber identification module (SIM) are cooperatively configured to perform operations, the operations can be performed by any one, some, or all of the components individually or in cooperation.

In one example embodiment, a system 1000 for transferring information in a dual data mode comprises: a network 1100; one or more one dual subscriber identification module (SIM) devices 1400; and at least one base station 1310, 1320, each base station 1310, 1320 comprising a look-up table for identifying dual subscriber identification module (SIM) devices 1400 that are connected, via the network, to the base station 1310, 1320 corresponding to the look-up table.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 8:
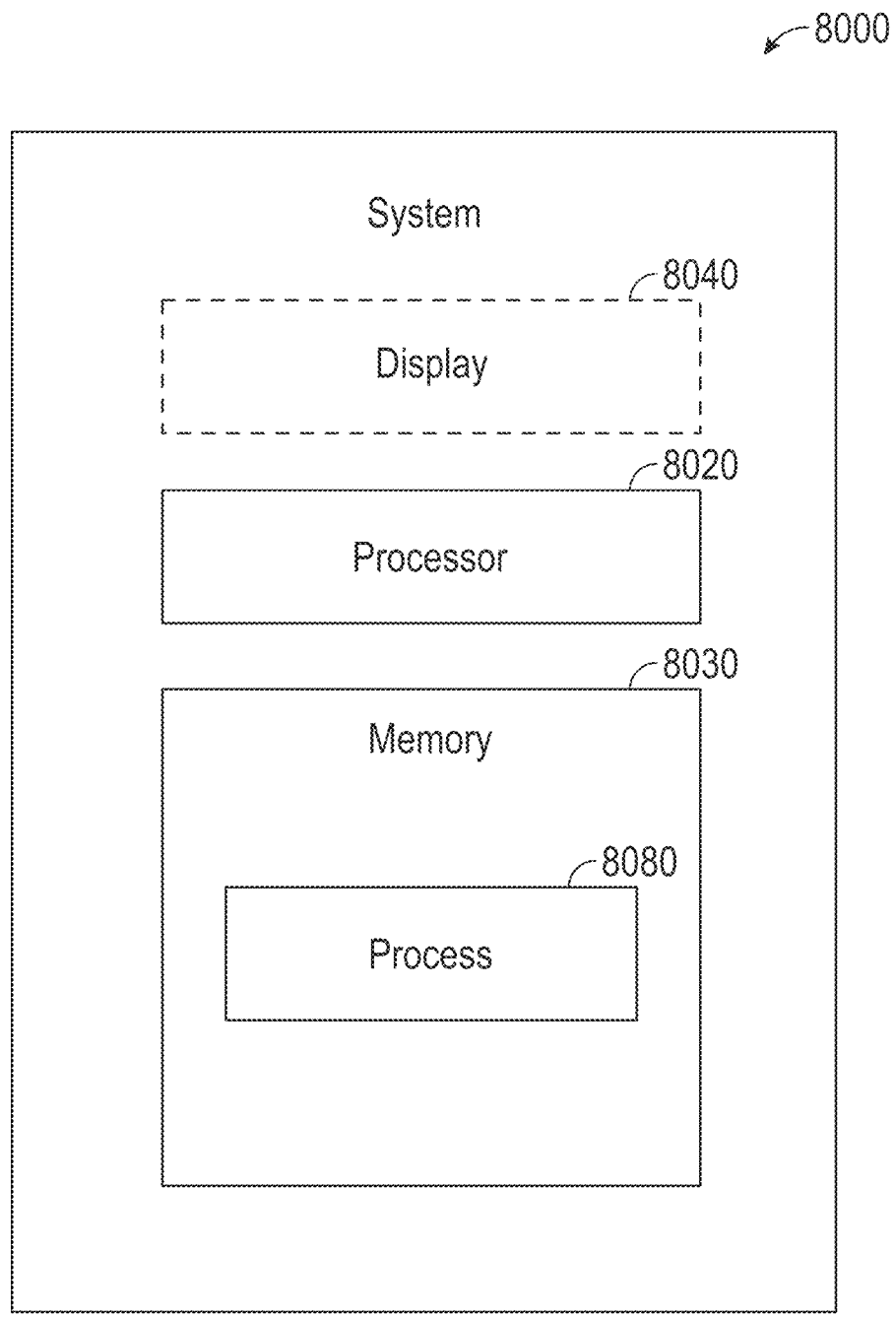
FIG. 8 is a block diagram of a system that can implement at least some aspects of the invention, and is representative, for example, of a spectrum access system and/or one or more of the servers shown in the figures.

FIG. 8 is a block diagram of a system 8000 that can implement at least some aspects of the invention, and is representative, for example, of the spectrum access system 1200 and/or one or more of the servers shown in the figures. The skilled artisan will appreciate that the spectrum access system 1200 could be implemented as a stand-alone server, as shown in FIG. 1, or could be a cloud implementation including one or more servers which could be virtualized with a hypervisor, as desired. As shown in FIG. 8, memory 8030 configures the processor 8020 to implement one or more methods, steps, and functions (collectively, shown as process 8080 in FIG. 8). The memory 8030 could be distributed or local and the processor 8020 could be distributed or singular. Different steps could be carried out by different processors.

The memory 8030 could be implemented as an electrical, magnetic or optical memory, or any combination of these or other types of storage devices. It should be noted that if distributed processors are employed, each distributed processor that makes up processor 8020 generally contains its own addressable memory space. It should also be noted that some or all of computer system 8000 can be incorporated into an application-specific or general-use integrated circuit. For example, one or more method steps could be implemented in hardware in an ASIC or via a field-programmable gate array (FPGA) rather than using firmware. Display 8040 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, the dual SIM device 6000 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on the dual SIM device 6000; a virtualized or non-virtualized hardware server implementing, or the like, and that such program may be embodied on a tangible computer readable recordable storage medium. As used herein, including the claims, unless it is unambiguously apparent from the context that only server software is being referred to, a "server" includes a physical data processing system (for example, system 8000 as shown in FIG. 8) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the components in FIGS. 1-6). The method steps can then be carried out using the distinct software modules of the system, as described above, executing on one or more hardware processors (e.g., one or more hardware processors of the dual SIM device 6000 and/or other depicted components). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for transferring data using a dual subscriber identification module (SIM) device, the method comprising the operations of:
   connecting a first subscriber identification module (SIM) of the dual subscriber identification module (SIM) device to a network;
   informing a small cell that the dual subscriber identification module (SIM) device is a dual SIM-type device;

attaching a first radio frequency device of the dual subscriber identification module (SIM) device to the network;
attaching a second radio frequency device of the dual subscriber identification module (SIM) device to the network;
configuring the small cell to treat the second subscriber identification module (SIM) as a control subscriber identification module (SIM) and to treat the first subscriber identification module (SIM) as a data subscriber identification module (SIM);
transferring user data to the first radio frequency device;
sending a control channel switch command to the dual subscriber identification module (SIM) device; and
transferring control information to the second radio frequency device.

2. The method of claim 1, further comprising locating the user data in a resource grid based on the control information.

3. The method of claim 1, further comprising using a same phone international mobile subscriber identity (IMSI) for the first subscriber identification module (SIM) and the second subscriber identification module (SIM) and using a same international mobile equipment identity (IMEI) for the first subscriber identification module (SIM) and the second subscriber identification module (SIM).

4. The method of claim 1, wherein the user data and the control information are transferred simultaneously for at least a portion of a transmission of the user data.

5. The method of claim 1, wherein the connecting of the first subscriber identification module (SIM) of the dual subscriber identification module (SIM) device to the network further comprises authenticating, by the network, the first subscriber identification module (SIM).

6. A dual subscriber identification module (SIM) device comprising:
a first subscriber identification module (SIM) and a second subscriber identification module (SIM);
a control and data separation module;
a memory; and
at least one processor coupled to said memory and in data communication with said control and data separation module, said first subscriber identification module (SIM), and said second subscriber identification module (SIM);
wherein said at least one processor coupled to said memory, said control and data separation module, said first subscriber identification module (SIM), and said second subscriber identification module (SIM) are cooperatively configured to perform operations comprising:
connecting the first subscriber identification module (SIM) of the dual subscriber identification module (SIM) device to a network;
informing a small cell that the dual subscriber identification module (SIM) device is a dual SIM-type device;
attaching a first radio frequency device of the dual subscriber identification module (SIM) device to the network;
attaching a second radio frequency device of the dual subscriber identification module (SIM) device to the network;
configuring the small cell to treat the second subscriber identification module (SIM) as a control subscriber identification module (SIM) and to treat the first subscriber identification module (SIM) as a data subscriber identification module (SIM);
transferring user data to the first radio frequency device;
sending a control channel switch command to the dual subscriber identification module (SIM) device; and
transferring control information to the second radio frequency device.

7. The dual subscriber identification module (SIM) device of claim 6, the operations further comprising locating the user data in a resource grid based on the control information.

8. The dual subscriber identification module (SIM) device of claim 6, the operations further comprising using a same phone international mobile subscriber identity (IMSI) for the first subscriber identification module (SIM) and the second subscriber identification module (SIM) and using a same international mobile equipment identity (IMEI) for the first subscriber identification module (SIM) and the second subscriber identification module (SIM).

9. The dual subscriber identification module (SIM) device of claim 6, wherein the user data and the control information are transferred simultaneously for at least a portion of a transmission of the user data.

10. The dual subscriber identification module (SIM) device of claim 6, wherein the control and data separation module comprises software and the operations are performed by the processor.

11. The dual subscriber identification module (SIM) device of claim 6, wherein the control and data separation module comprises software and a separation processor, and the operations are performed by a separation processor.

12. A non-transitory computer readable medium comprising computer executable instructions which when executed by a processor of a dual subscriber identification module (SIM) device cause the processor to perform operations comprising:
connecting a first subscriber identification module (SIM) of the dual subscriber identification module (SIM) device to a network;
informing a small cell that the dual subscriber identification module (SIM) device is a dual SIM-type device;
attaching a first radio frequency device of the dual subscriber identification module (SIM) device to the network;
attaching a second radio frequency device of the dual subscriber identification module (SIM) device to the network;
configuring the small cell to treat a second subscriber identification module (SIM) as a control subscriber identification module (SIM) and to treat the first subscriber identification module (SIM) as a data subscriber identification module (SIM);
transferring user data to the first radio frequency device;
sending a control channel switch command to the dual subscriber identification module (SIM) device; and
transferring control information to the second radio frequency device.

13. The non-transitory computer readable medium of claim 12, the operations further comprising locating the user data in a resource grid based on the control information.

14. The non-transitory computer readable medium of claim 12, the operations further comprising using a same phone international mobile subscriber identity (IMSI) for the first subscriber identification module (SIM) and the second subscriber identification module (SIM) and using a same international mobile equipment identity (IMEI) for the first subscriber identification module (SIM) and the second subscriber identification module (SIM).

15. The non-transitory computer readable medium of claim 12, wherein the user data and the control information are transferred simultaneously for at least a portion of a transmission of the user data.

16. The non-transitory computer readable medium of claim 12, wherein the connecting of the first subscriber identification module (SIM) of the dual subscriber identification module (SIM) device to the network further comprises authenticating, by the network, the first subscriber identification module (SIM).

17. A system for transferring information in a dual data mode, the system comprising:
a network;
a plurality of dual subscriber identification module (SIM) devices; and
at least one base station, the at least one base station comprising a look-up table for identifying those of the plurality of dual subscriber identification module (SIM) devices that are connected, via the network, to the base station corresponding to the look-up table, the look-up table including an indication that at least one of the dual subscriber identification module (SIM) devices is operating in a dual data mode wherein control information is handled by a first SIM of the device and user data is handled by a second SIM of the device, the first and second SIMS both being connected to the network.

18. A system for transferring information in a dual data mode, the system comprising:
a network;
one or more one dual subscriber identification module (SIM) devices; and
at least one base station, each base station comprising a look-up table for identifying dual subscriber identification module (SIM) devices that are connected, via the network, to the base station corresponding to the look-up table;
wherein the dual subscriber identification module (SIM) device comprises a first subscriber identification module (SIM) and a second subscriber identification module (SIM); and a control and data separation module.

19. The system of claim 18, wherein the dual subscriber identification module (SIM) device further comprises:
a memory; and
at least one processor coupled to said memory and in data communication with said control and data separation module, said first subscriber identification module (SIM), and said second subscriber identification module (SIM);
wherein said at least one processor coupled to said memory, said control and data separation module, said first subscriber identification module (SIM), and said second subscriber identification module (SIM) are cooperatively configured to perform operations comprising:
connecting the first subscriber identification module (SIM) of the dual subscriber identification module (SIM) device to a network;
informing a small cell that the dual subscriber identification module (SIM) device is a dual SIM-type device;
attaching a first radio frequency device of the dual subscriber identification module (SIM) device to the network;
attaching a second radio frequency device of the dual subscriber identification module (SIM) device to the network;
configuring the small cell to treat the second subscriber identification module (SIM) as a control subscriber identification module (SIM) and to treat the first subscriber identification module (SIM) as a data subscriber identification module (SIM);
transferring user data to the first radio frequency device;
sending a control channel switch command to the dual subscriber identification module (SIM) device; and
transferring control information to the second radio frequency device.

20. The system of claim 19, wherein the connecting of the first subscriber identification module (SIM) of the dual subscriber identification module (SIM) device to the network further comprises authenticating, by the network, the first subscriber identification module (SIM).

* * * * *